A. L. MOWRY & J. F. MULLANEY.
MILK STRAINER.
APPLICATION FILED JAN. 20, 1908.
902,675.
Patented Nov. 3, 1908.
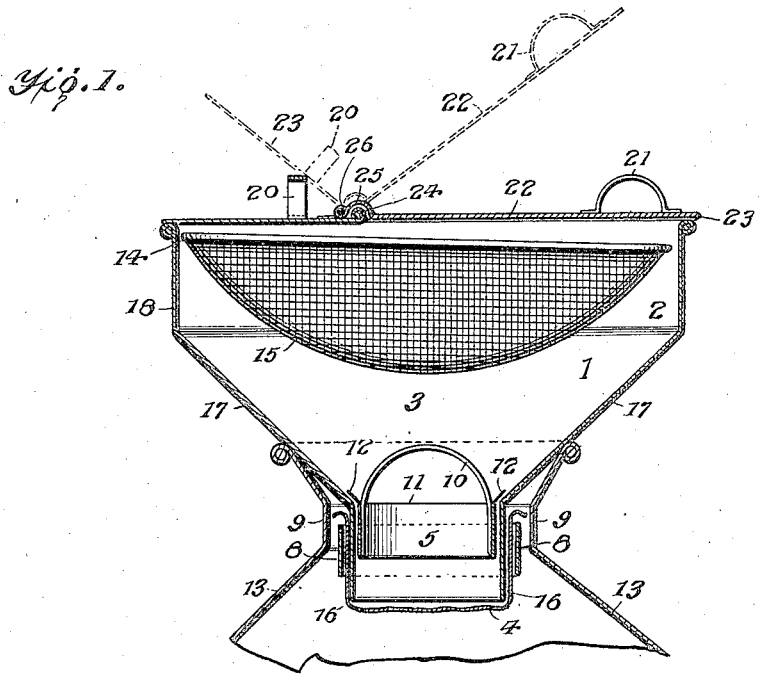
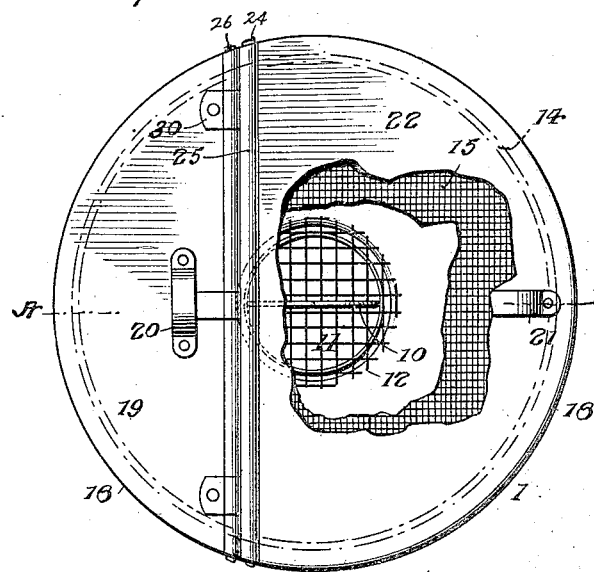
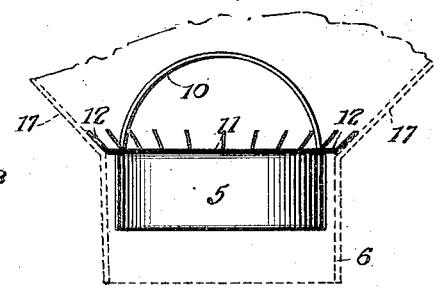
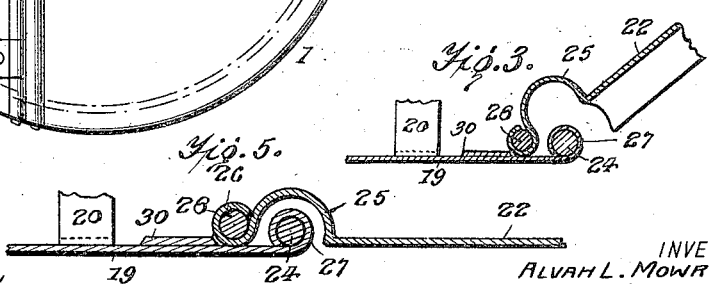
WITNESSES
L. H. Schmidt
W. L. Phillips
INVENTORS
ALVAH L. MOWRY,
JOHN F. MULLANEY,
BY John F. Mullaney
ATTORNEY

UNITED STATES PATENT OFFICE.

ALVAH L. MOWRY AND JOHN F. MULLANEY, OF COLORADO SPRINGS, COLORADO.

MILK-STRAINER.

No. 902,675.

Specification of Letters Patent.

Patented Nov. 3, 1908.

Application filed January 20, 1908. Serial No. 411,786.

*To all whom it may concern:*

Be it known that we, ALVAH L. MOWRY and JOHN F. MULLANEY, citizens of the United States, residing at Colorado Springs, in the county of El Paso and State of Colorado, have invented a new and useful Milk-Strainer, of which the following is a specification.

Our invention relates to improvements in milk strainers in which a lid or cover having a sanitary hinge is used in connection with a suitable tank to receive the unstrained milk and having two separate cloth strainers and a metal screen strainer through which the milk must pass to get to the can or tank below it made to receive the strained milk; and the objects of our invention are first, to provide a sanitary hinge, that will not allow dust, liquid or other foreign matter to pass through to the receptacle or tank of the strainer; second, to provide a lid that will keep dust, liquid or other foreign matter from the receptacle or tank of the strainer and at the same time be easily opened by the operator;
third, to provide a strainer cloth near the top of the receptacle or tank of the strainer, to catch all large foreign particles and hold them above the body or volume of the milk or other liquid in the receptacle or tank and one that will be easily removed, cleaned and replaced during milking time; fourth, to provide a metal screen near the bottom of the receptacle to catch hair and other foreign particles that may be in the milk so that they will not clog the sanitary cloth strainer below it, and to have said metal screen so arranged that it can be easily and quickly removed, cleaned and replaced during milking process; fifth, a strainer cloth at the bottom of the strainer that can be filled with prepared cotton for straining and for disinfecting the milk or other liquid, and so arranged that it can be easily and quickly removed and other cotton or fabric inserted in its stead and then quickly replaced; and sixth, to provide a strainer that will be of suitable shape to be inserted into the top of a common shipping can for milk, and while it rests upon the top of the milk can it will not careen or tip off and will not allow dust or other foreign matter to get into the milk can or other receptacle below it.

We attain these objects by means of the mechanism and appliance illustrated in the accompanying drawing, in which—

Figure 1 is a vertical sectional side view of the entire milk strainer resting on the top of a common milk shipping can, and all dissected through on the line of A, B, as shown in Fig. 2; Fig. 2, is a top view of the entire milk strainer, with a part of the cover or lid 22, removed so as to show and disclose below it a part of the wire screen on metal strainer; Fig. 3, shows a part of the lid and stationary top, and a side view of all the hinge of the lid on actual scale or approximately its actual size; Fig. 4, is a vertical side view of the metal strainer just entering down into the nose of the milk strainer, a sectional part of which is shown at 17, and 6; Fig. 5, is a vertical side view of a part of a section of the sanitary hinge dissected through on the line A, B, and showing the lid 22 closed down, while it is shown raised partly open in Fig. 3.

Similar figures and letters refer to similar parts throughout the several views.

The stationary cover or top 19, the movable lid 22, with their peculiar sanitary hinges 25, 27, 28, in connection with the suitable receiving tank, 1, 2, 3, and the three strainers 11, 15, and 16, constitute the principal parts of our invention and improvement.

It is often the practice to place the milk strainer on the top of the can or tank, in the room where the cows or other animals are being milked, or exposed to objectionable conditions elsewhere, and an open strainer exposes the milk to flies and other insects, as well as dust and other foreign matter that may get into the strainer or the can. We obviate these difficulties by means of a cover 19, and 22, provided with a sanitary hinge so arranged that the lid 22, overlaps the free edge of the top cover 19, in such a manner that no insects, dust or other foreign particles or matter can enter the hinge when the lid is closed, nor can they slide off the lid through the hinge when the lid is raised and the strainer opened, as they would slide down onto the top cover 19, as the hinge joint proper is covered by arch 25, in lid 22. In case of rain or dust, when the lid is closed and the strainer is exposed to them, they cannot enter through the top at any place, as the hinge is guarded by the elevations of 24, and 27 from the stationary part of the top 19, and the lid has a large flange around its outer edge that projects over the top of the receptacle and is guarded at its hinged edge by the raised arch 25.

When a milker has finished milking his cow or filled his pail, he goes to the strainer, which rests in the top of a milk can, or in the top of a suitable milk tank, and raises the lid 22, by means of the lid handle 21, and tilts the lid back against strainer handle 20, where it rests by its weight, till desired to be closed; he then pours his milk into the receptacle tank, and it passes through strainer cloth 15, which is held in place by means of a spring wire hoop upon which it is fastened or laid, which hoop 14, is held in place by means of the friction caused by its pressure against the inside surface of the upper cylindrical part 2, of the tank: any hair or flies or other coarse particles of foreign matter from the milker's pail falling upon the said strainer cloth 15, will be held from the body of the milk in the tank and not allowed to be drawn down into it to soak while the milk is filtering through strainers 11, and 16, but the milker can immediately remove the strainer cloth 15, and the wire hoop 14, and shake off the foreign matter or replace the cloth with a clean one and reinsert it. The milk then passes through wire gauze or screen 11, which is spread upon the top end of a vertical circular tube, of flat metal just large enough to enter loosely into the neck of the strainer body, and is provided with an arched handle 10, by means of which it can be easily removed and cleansed; the annular edge 12, of the wire screen rests upon the top of the inside surface where the walls of 17, are joined to the walls of 6, and the wire screen prevents hair, froth, and other foreign matter from settling down to the cloth strainer 16, and clogging it as is the case often. The milk then filters slowly through the strainer fabric 16, which is composed of two or more thicknesses of thin cloth in the folds of which may be held suitable strainer cotton made for the purpose of catching and holding small particles of foreign matter and separating them from the milk.

The rolled tubular edge 27, and the rolled tubular edge 28, are soldered down to 19, and 25, respectively, so as to make them tight sanitary and strong. The lid is stiffened about its edge by means of the semicircular stiffening flange 23, which is soldered to its under side near its outer edge, and passes down just inside of the vertical walls of the tank or receptacle 18, and assists in keeping out flies and other obnoxious matter from the milk. The lid and top 19, are also stiffened and their hinge edges by means of the wire rods 24, and 26, and the rolled tubes, 27, and 28. Hinge clips 30, pass around the wire rod 26, which wire rod also passes through the rolled tubular edge 28, of lid 22, thus forming the hinge joint with stationary top 19. These said hinge clips are soldered or riveted to the top of stationary top 19. The strainer handle 20, is an arched shaped flat metal handle with abutments by means of which it is fastened to the top surface of stationary top 19, by means of solder or rivets, and near the center of the length of 19, and near the hinge of lid 22, so that the lid 22, may rest back against it, 20, when the lid is open to receive the milk or other liquid, or for other purposes as desired.

We hold that this strainer may be useful for straining fruit juices and other liquids, by the same apparatus used for milk. The cloth strainer at the bottom of the strainer neck is held in place by means of flat metal ring, 8 as shown in Fig. 1, being slipped on over the strainer cloth 16, when it is pressed up against and over the nose 6, of the strainer and holds it there by means of the friction caused by the tightness of the metal ring 8, pressing the strainer cloth 16, against the outer sides of nose 6.

We are aware that prior to our invention, milk cans carrying milk strainers, and other tanks or receptacles for juices in the manufactories have used tank strainers for separating objectionable particles from the expressed juices which they wish to preserve. We therefore do not claim broadly a milk strainer with a cloth at its bottom to strain the milk or to strain other juices of manufacture, but

We claim:—

1. A receptacle having a two part cover one of the parts being integral with the receptacle and the other part being hinged to the integral part on its top and near to the free edge of the integral part, in combination with a coarse cloth strainer in the upper part of said receptacle, secured therein by means of a spring metal hoop, said receptacle having at its outlet at its bottom a tubular neck projecting into the bottom of the receptacle from below and also projecting downward from said receptacle from one to four inches, and supporting on its upper end and within said receptacle a metal frame having suspended thereon a fabric strainer covering the orifice in the top of said tubular neck, all substantially as set forth.

2. A receptacle having a two-part cover, each part being hinged to the other across the top of said receptacle, the one part overlapping the other at the hinged edges, the hinged edge of the under part having an upwardly projecting rib extending its entire length and the hinged edge of the upper part being hinged to the top side of the under part as close as practicable to the said upwardly projecting rib of the under part, and the upper part having an upwardly curved recess near its hinged edge suitable to receive the said upwardly projecting rib, when the upper part is closed down parallel with the under part, all substantially as set forth.

3. A sanitary metal cover for milk strainers and other receptacles, consisting of two parts, one part of which is hinged on top of the other near the middle of the cover so that the straight free edge of the under part of the cover projects under and past the hinge and under the hinged edge of the top part of the cover, and then upward into an arched shaped recess in the top part of the said cover, all substantially as set forth and for the purposes specified.

4. A sanitary metal cover, for milk strainers or other receptacles, consisting of two parts, the joined edges of which overlap one another, the top part being hinged to the under part and having near its hinged edge an upward arched curve forming beneath the said curve a recess made to receive the upward projecting ribbed edge of the hinge edge of the under part of the said cover, all substantially as set forth and for the purposes specified.

5. The two-part cover 19 and 22, having rib 27, and recess 29, and being hinged at 26, all substantially as set forth and for the purposes as specified.

6. In a strainer for milk, vegetable juices or other liquids, a receptacle having a two-part cover the one part integral with the receptacle and the other part hinged upon the integral part and having a flat annular flange, semicircular in form, attached to its under side near the outer edge of the lid fitted to pass down on the inside of the wall of the receptacle suitably close to exclude insects or foreign substances, the said receptacle having also a cloth strainer near its top opening supported on a spring wire hoop pressing against the inside of said receptacle, and said receptacle having also a wire strainer screen mounted on an annular hoop frame having an arched handle and situated near the bottom of the said receptacle on the inside, said receptacle having also a strainer cloth of two or more folds or thicknesses and containing between its folds sterilized cotton or other similar or suitable substances and said cloth being secured removably and adjustably over the exit of said receptacle by means of a band ring slipped on over the said exit, all in combination with a milk-shipping can or other suitable tank or receptacle, substantially as set forth.

7. In a strainer for milk or other liquids the combination of the two-part cover described, one part of which is integral with a suitable receptacle for liquids, and having a raised rib projecting upward under the other part of the cover, the lid hinged above and to the said integral part of cover near said rib and having a lineal arch extending across said cover to receive said rib when the lid is closed, the receptacle having a body tapering downward and made to fit the different sizes of orifice in the receiving can or tank below the strainer, and having three separate strainer fabrics, one near the top, one near the middle and one at the bottom of said receptacle, all substantially as set forth and for the purposes specfied.

ALVAH L. MOWRY.
JOHN F. MULLANEY.

Witnesses:
HENRY K. HOLDEMAN,
HERBERT K. WING.